(12) United States Patent
Helmick et al.

(10) Patent No.: US 8,780,479 B1
(45) Date of Patent: Jul. 15, 2014

(54) DISK DRIVE EXECUTING JERK SEEKS TO ROTATE PIVOT BALL BEARINGS RELATIVE TO RACES

(71) Applicant: Western Digital Technologies, Inc., Irvine, CA (US)

(72) Inventors: Daniel L. Helmick, Broomfield, CO (US); Shane Walker, Longmont, CO (US); Orhan Beker, Dove Canyon, CA (US); Charles D. Richards, Longmont, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/925,820

(22) Filed: Jun. 24, 2013

Related U.S. Application Data

(60) Provisional application No. 61/824,552, filed on May 17, 2013.

(51) Int. Cl.
*G11B 5/55* (2006.01)
(52) U.S. Cl.
USPC .......................................... 360/55; 360/78.04
(58) Field of Classification Search
None
See application file for complete search history.

(56) References Cited

U.S. PATENT DOCUMENTS

| | | | |
|---|---|---|---|
| 5,667,312 A | 9/1997 | Grunze et al. | |
| 6,302,588 B1 | 10/2001 | Brown | |
| 6,304,409 B1 * | 10/2001 | Allsup | 360/77.03 |
| 6,469,863 B1 * | 10/2002 | Ell | 360/78.04 |
| 6,636,375 B1 | 10/2003 | Ding et al. | |
| 6,714,378 B1 * | 3/2004 | Uno et al. | 360/78.04 |
| 6,754,024 B2 | 6/2004 | Suk et al. | |
| 6,850,386 B2 * | 2/2005 | Kovinskaya et al. | 360/78.06 |
| 7,208,898 B2 * | 4/2007 | Stoecker et al. | 360/78.04 |
| 7,289,290 B2 * | 10/2007 | Lee | 360/78.06 |
| 7,289,291 B1 | 10/2007 | Schlumberger | |
| 7,304,817 B1 | 12/2007 | Kang et al. | |
| 7,359,140 B2 * | 4/2008 | Chung | 360/78.06 |
| 7,441,959 B2 | 10/2008 | Hanada et al. | |
| 7,722,322 B2 * | 5/2010 | Altieri et al. | 416/1 |
| 8,480,364 B2 * | 7/2013 | Altieri et al. | 416/1 |
| 2010/0296199 A1 * | 11/2010 | Boutaghou | 360/264 |
| 2011/0080675 A1 * | 4/2011 | Boutaghou et al. | 360/294 |

* cited by examiner

*Primary Examiner* — Wayne Young
*Assistant Examiner* — James L Habermehl

(57) ABSTRACT

A disk drive is disclosed comprising a disk comprising a plurality of tracks, a head attached to a distal end of an actuator arm, and a voice coil motor (VCM) operable to rotate the actuator arm about a pivot bearing including a race and a plurality of ball bearings. The VCM is controlled to execute a first jerk seek in a first radial direction so that the ball bearings slip within the race by a first rotation angle. The VCM is controlled to execute a second jerk seek in the first radial direction so that the ball bearings slip within the race by a second rotation angle, wherein the second rotation angle adds to the first rotation angle in order to rotate the ball bearings relative to the race at a reference angle of the pivot bearing.

28 Claims, 6 Drawing Sheets

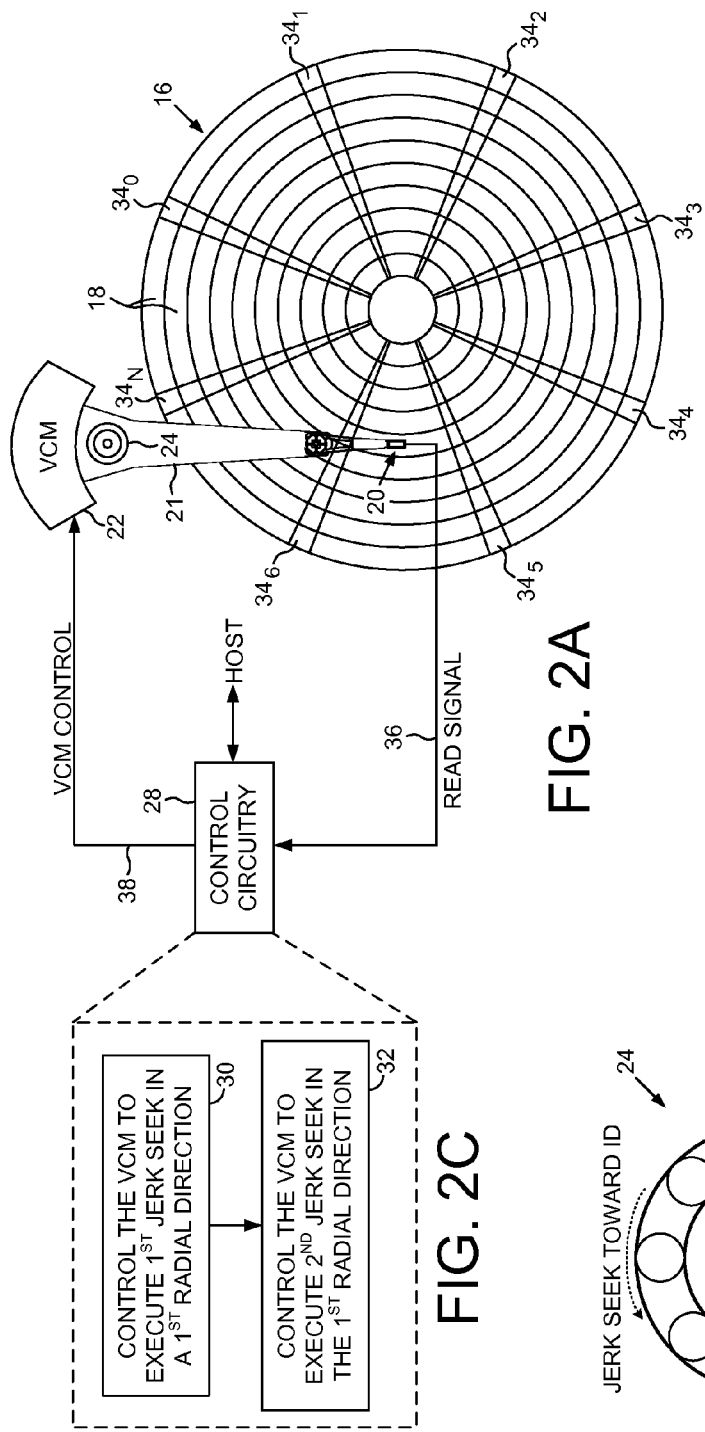
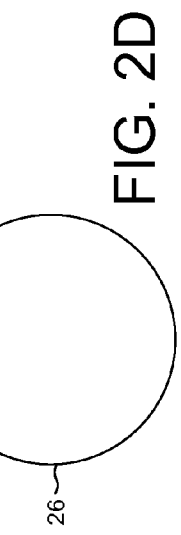
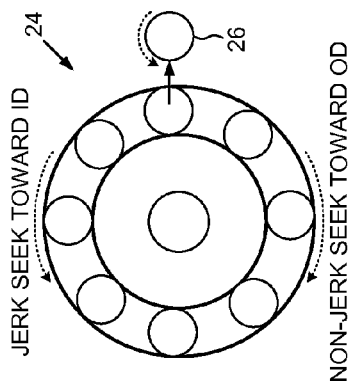
FIG. 2A
FIG. 2B
FIG. 2C
FIG. 2D

DISK DRIVE EXECUTING JERK SEEKS TO ROTATE PIVOT BALL BEARINGS RELATIVE TO RACES

CROSS-REFERENCE TO RELATED APPLICATIONS

This application claims priority to provisional U.S. Patent Application Ser. No. 61/824,552, filed on May 17, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 2A shows a disk drive according to an embodiment comprising a head actuated over a disk by a voice coil motor (VCM) comprising a pivot bearing.

FIG. 2B shows a pivot bearing according to an embodiment comprising a race and a plurality of ball bearings.

FIG. 2C is a flow diagram according to an embodiment wherein first and second jerk seeks are executed in a first radial direction so that the ball bearings slip within the race in order to rotate the ball bearings relative to the race at a reference angle of the pivot bearing.

FIG. 2D illustrates one of the ball bearings slipping within the race by an accumulated rotation angle after executing successive jerk seeks according to an embodiment.

DETAILED DESCRIPTION

Figure 1:
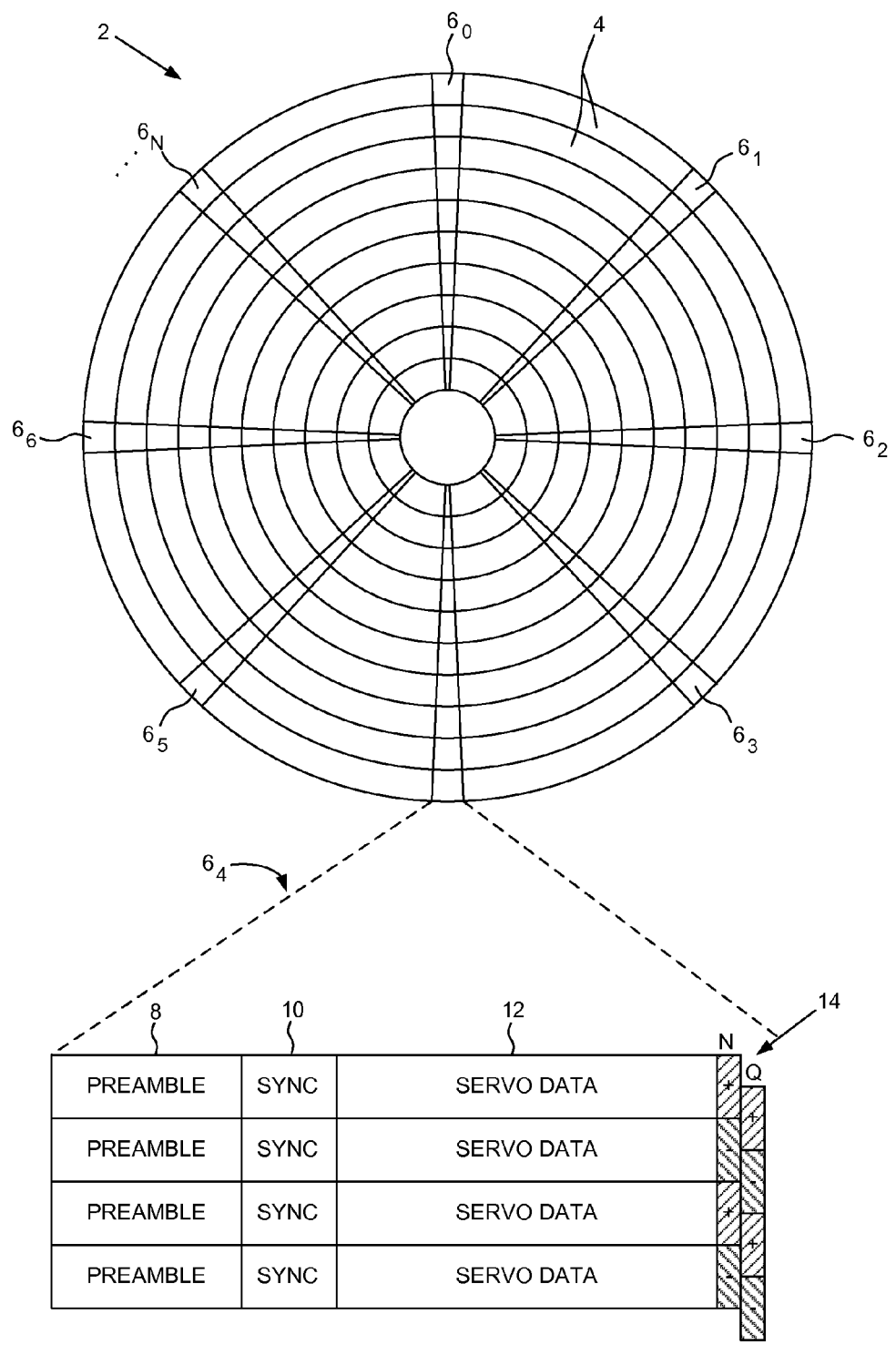
FIG. 1 shows a prior art disk format comprising a plurality of tracks defined by servo sectors.

FIG. 2A shows a disk drive according to an embodiment comprising a disk 16 comprising a plurality of tracks 18, a head 20 attached to a distal end of an actuator arm 21, and a voice coil motor (VCM) 22 operable to rotate the actuator arm 21 about a pivot bearing 24 (FIG. 2B) including a race and a plurality of ball bearings (e.g., ball bearing 26). The disk drive further comprises control circuitry 28 operable to execute the flow diagram of FIG. 2C, wherein the VCM is controlled to execute a first jerk seek in a first radial direction so that the ball bearings slip within the race by a first rotation angle (block 30). The VCM is controlled to execute a second jerk seek in the first radial direction so that the ball bearings slip within the race by a second rotation angle (block 32), wherein the second rotation angle adds to the first rotation angle in order to rotate the ball bearings relative to the race at a reference angle of the pivot bearing 24 as illustrated in FIGS. 2B and 2D. That is, during a jerk seek the momentum will cause the ball bearings to slip within the race such that when the pivot bearing 24 is at a particular reference angle, the surface of the ball bearings relative to the race will have changed. In one embodiment, changing the ball bearing/race surface contact over time may help reduce friction effects.

In one embodiment, the control circuitry 28 is operable to control the VCM 22 to execute a number of jerk seeks in the first direction to cause the ball bearings to rotate at least 180 degrees relative to the race at the reference angle of the pivot bearing 24. In the example shown in FIG. 2D, the ball bearings will rotate within the race by at least 180 degrees after performing approximately eight jerk seeks toward the inner diameter (ID) of the disk 16. In another embodiment, the jerk seeks may be executed by seeking the head toward the outer diameter (OD) of the disk 16 (rather than the ID) so that the ball bearings rotate in the reverse direction when slipping within the race. In yet another embodiment, the control circuitry 28 may execute a first number of jerk seeks in one radial direction, and a second number of jerk seeks in an opposite radial direction, wherein the second number is greater than the first number resulting in net movement of the ball bearings within the race.

In the embodiment of FIG. 2A, the tracks 18 on the disk 16 are defined by servo sectors $34_0$-$34_N$. The control circuitry 28 processes a read signal 36 emanating from the head 20 to demodulate the servo sectors $34_0$-$34_N$ and generate a position error signal (PES) representing an error between the actual position of the head and a target position relative to a target track. The control circuitry 28 filters the PES using a suitable compensation filter to generate a control signal 38 applied to the VCM 22 which rotates the actuator arm 21 about the pivot bearing 24 in order to actuate the head 20 radially over the disk 16 in a direction that reduces the PES. The servo sectors $34_0$-$34_N$ may comprise any suitable head position information, such as a track address for coarse positioning and servo bursts for fine positioning. The servo bursts may comprise any suitable pattern, such as an amplitude based servo pattern or a phase based servo pattern.

Figure 3A:
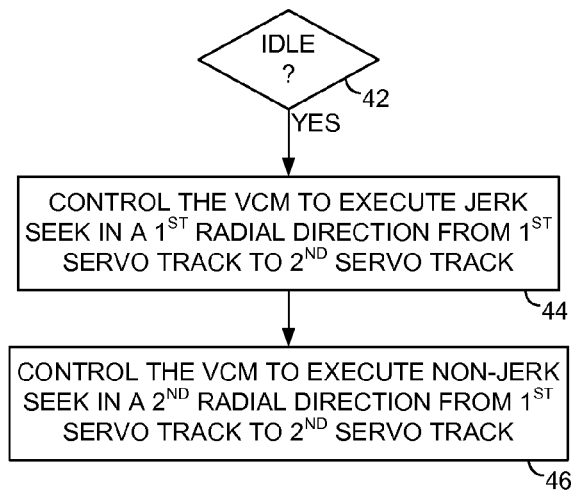
FIG. 3A is a flow diagram according to an embodiment wherein during an idle mode a jerk seek is executed from a first track to a second track, and then a second non-jerk seek is executed from the second track back to the first track.

In one embodiment, the control circuitry 28 may execute a jerk seek during an idle mode when not servicing host commands. For example, in one embodiment the disk 16 may be written in a shingled mode using log structured writes where data is written to consecutive (overlapping) data tracks requiring only single track seeks. When the disk drive enters an idle mode, the control circuitry 28 may execute the flow diagram of FIG. 3A wherein after detecting the idle mode (block 42) the VCM may be controlled to execute a jerk seek to seek the head from a first track (e.g., current track) to a second track (block 44). The VCM may then be controlled to execute a non-jerk seek to seek the head from the second track back to the first track (block 46). In one embodiment, the jerk seek causes the ball bearings to slip within the race due to a jerk force, whereas the non-jerk seek has minimal jerk force and therefore essentially no slipping of the ball bearings within the race. In this manner, the slipping of the ball bearings within the race during the jerk seek is preserved when the head is returned to the first track.

The control circuitry 28 may control the VCM 22 in any suitable manner in order to execute a jerk seek that causes the ball bearings to slip within the race. In one embodiment illustrated in FIG. 3B, the control circuitry 28 controls the VCM relative to a first state trajectory to execute the a jerk seek in a first radial direction (toward the ID), and then controls the VCM relative to a second state trajectory to execute a non-jerk seek in a second radial direction opposite the first radial direction. Any suitable non-jerk seek may be employed, such as a normal seek executed while accessing data from the disk during an access operation, or a less aggressive seek that is slower than a normal seek.

Figure 3B:
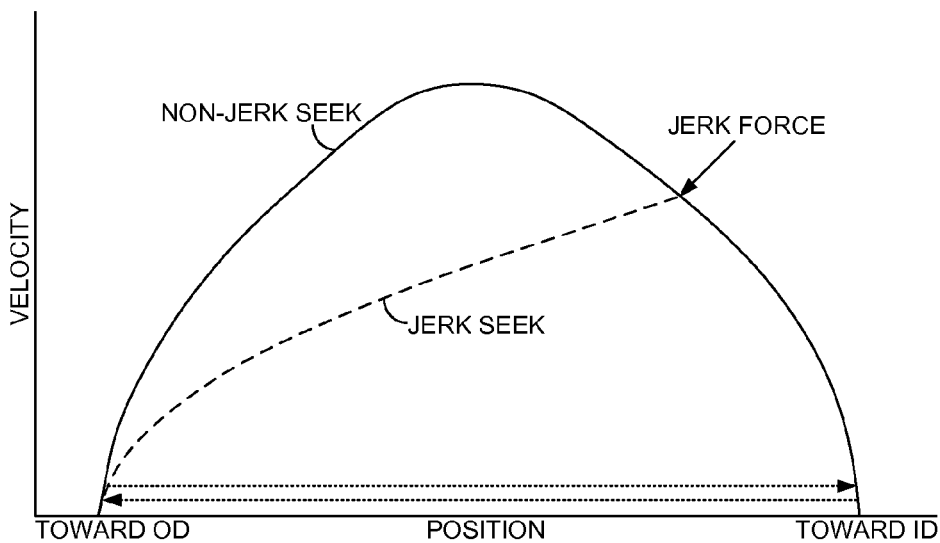
FIG. 3B shows an embodiment wherein a jerk force is applied to the pivot bearing at the transition from acceleration to deceleration in a state trajectory.
Figure 4A:
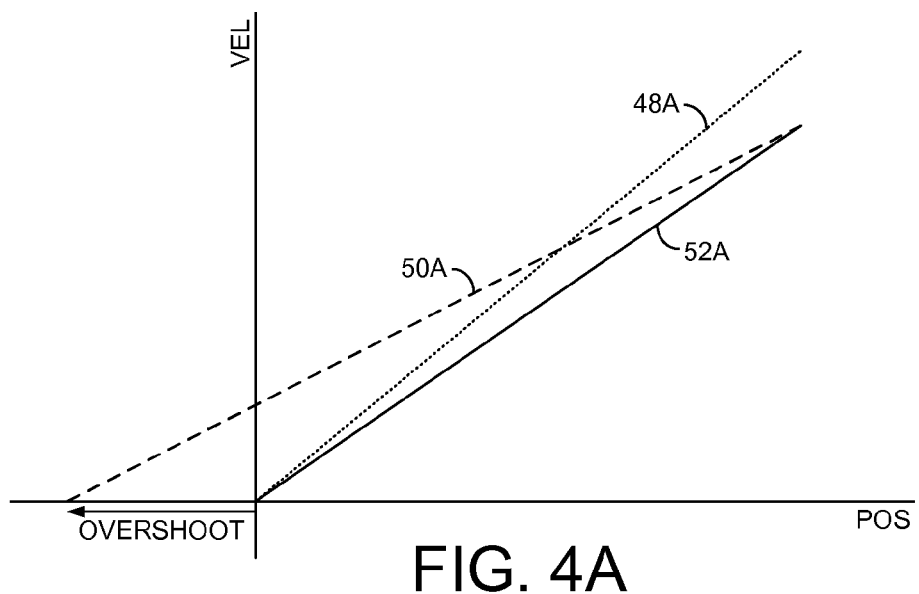
FIGS. 4A and 4B show a normal seek state trajectory and jerk seek state trajectory which may result in an overshoot or an undershoot.
Figure 4B:
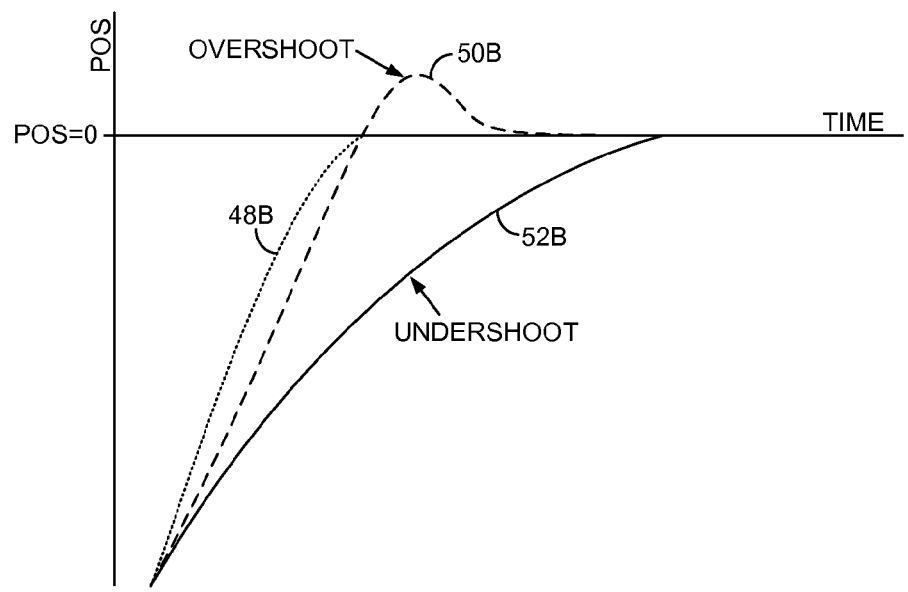

The state trajectory may be designed to generate a jerk force at any suitable time during the seek, wherein in the embodiment shown in FIG. 3B, the state trajectory causes a jerk force when transitioning from an acceleration trajectory to a deceleration trajectory. When executing the normal seek, the state trajectory comprises a smoother transition from acceleration to deceleration, and therefore a lesser amount of jerk force is applied to the pivot bearing 24. In one embodiment, the state trajectory for the jerk seek deviates from a normal (optimal) state trajectory, and therefore the resulting seek performance is suboptimal. FIGS. 4A and 4B illustrate an embodiment wherein the state trajectory 48A of a normal seek results in an optimal (minimal) seek time 48B to the target track. In one embodiment, the state trajectory 50A of a jerk seek causes the head to overshoot 50B the target track, and in another embodiment the state trajectory 52A of a jerk seek causes the head to undershoot 52B the target track as illustrated in FIG. 4B.

Figure 5:
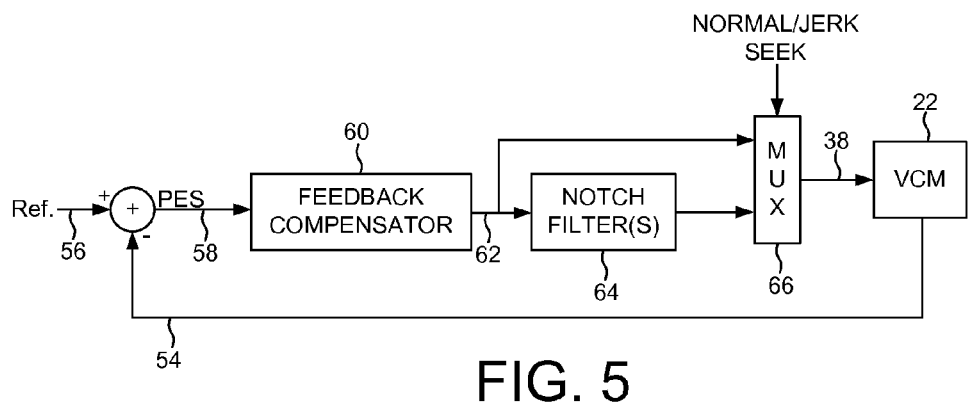
FIG. 5 shows a servo control system wherein one or more notch filters are disabled in order to execute a jerk seek according to an embodiment.

FIG. 5 shows a servo control system implemented by the control circuitry 28 for seeking the head 20 over the disk 16 according to an embodiment, wherein the measured position 54 of the head (as determined from reading the servo sectors) is subtracted from a reference position 56 to generate the PES 58. The PES 58 is filtered by a feedback compensator 60 to generate a compensated control signal 62. During a normal seek, the compensated control signal 62 is filtered by one or more notch filters 64 to generate the control signal 38 applied to the VCM 22. In one embodiment, during a jerk seek a multiplexer 66 is configured to disable the notch filter(s) 64 such that the compensated control signal 62 is applied directly to the VCM 22. In one embodiment, disabling the notch filter(s) 64 causes the desired jerk force to be applied to the pivot bearing 24 during the jerk seek.

Figure 6:
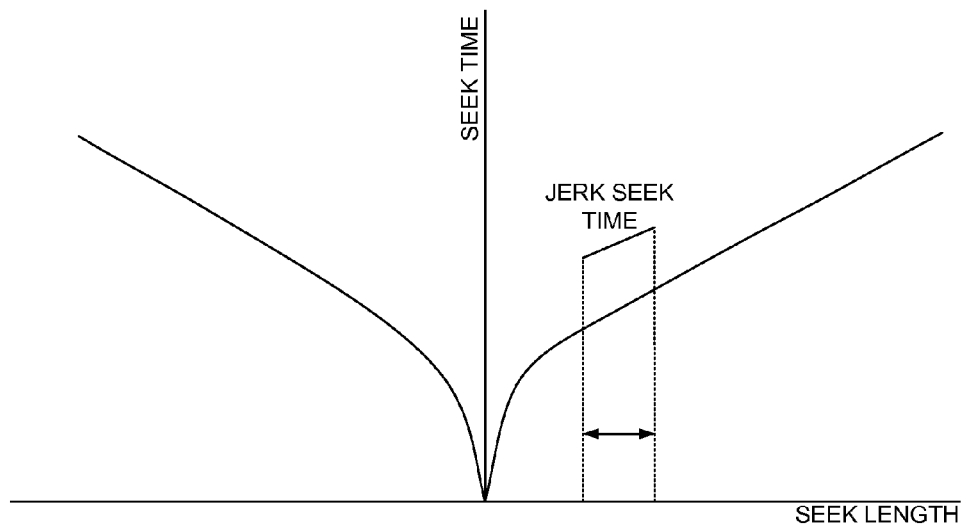
FIG. 6 shows an embodiment wherein a jerk seek is executed based on a seek length range, wherein the seek time is increased due to the jerk seek.

In one embodiment, the control circuitry 28 executes a jerk seek for a desired seek length. For example, a particular seek length may correspond to a state trajectory that provides a desired amount of jerk force during the seek. In the example shown in FIG. 3B, the seek length may correspond to a normal state trajectory wherein the velocity of the VCM 22 accelerates to a peak velocity and then transition into a deceleration trajectory which may maximize the jerk force of the jerk seek, whereas a shorter seek length may not reach a high enough velocity, and a longer seek length may exhibit less jerk force when transitioning from a constant velocity to the deceleration trajectory. In one embodiment illustrated in FIG. 6, the control circuitry 28 may execute a jerk seek when servicing a host command if the seek length for the host command falls within a target seek length range. That is, if the seek length falls within the target seek length range, executing a jerk seek will apply the desired jerk force to the pivot bearing 24. FIG. 6 also illustrates that when a jerk seek is executed over the seek length range, the seek time is increased as compared to a normal seek due to the above described suboptimal performance of a jerk seek.

In one embodiment, the control circuitry 28 executes a jerk seek only if the increased seek time of the jerk seek will not degrade performance. For example, in one embodiment the control circuitry may select a host command from a command queue based on a rotation position optimization (RPO) algorithm based on a seek and rotational latency for each host command. The control circuitry 28 may then execute a jerk seek if the rotational latency of the selected host command exceeds a threshold such that the extra seek time of a jerk seek will not cause a slipped disk revolution. This embodiment is understood with reference to the flow diagram of FIG. 7, wherein when host commands are received (block 68), the host commands are stored in a command queue (block 70). An RPO algorithm is then executed to select the host command from the command queue that has the minimal seek and rotational latency (block 72). If a jerk seek is needed, for example, if N consecutive normal seeks have been executed without executing a jerk seek (block 73), and if the seek direction for the selected host command is in the desired radial direction (block 74) such as toward the ID, and the seek length of the selected host command falls within a target seek length range (block 76), and the rotational latency of the selected host command exceeds a threshold (block 78), then a jerk seek is executed (block 80) in order to change the ball bearing/race surface contact. Otherwise, a normal seek is executed (block 82) for the selected host command. Over time as a sufficient number of host commands meet the criteria of FIG. 7, the accumulated jerk seeks will cause the ball bearing/race surface contact to be periodically renewed.

Figure 7:
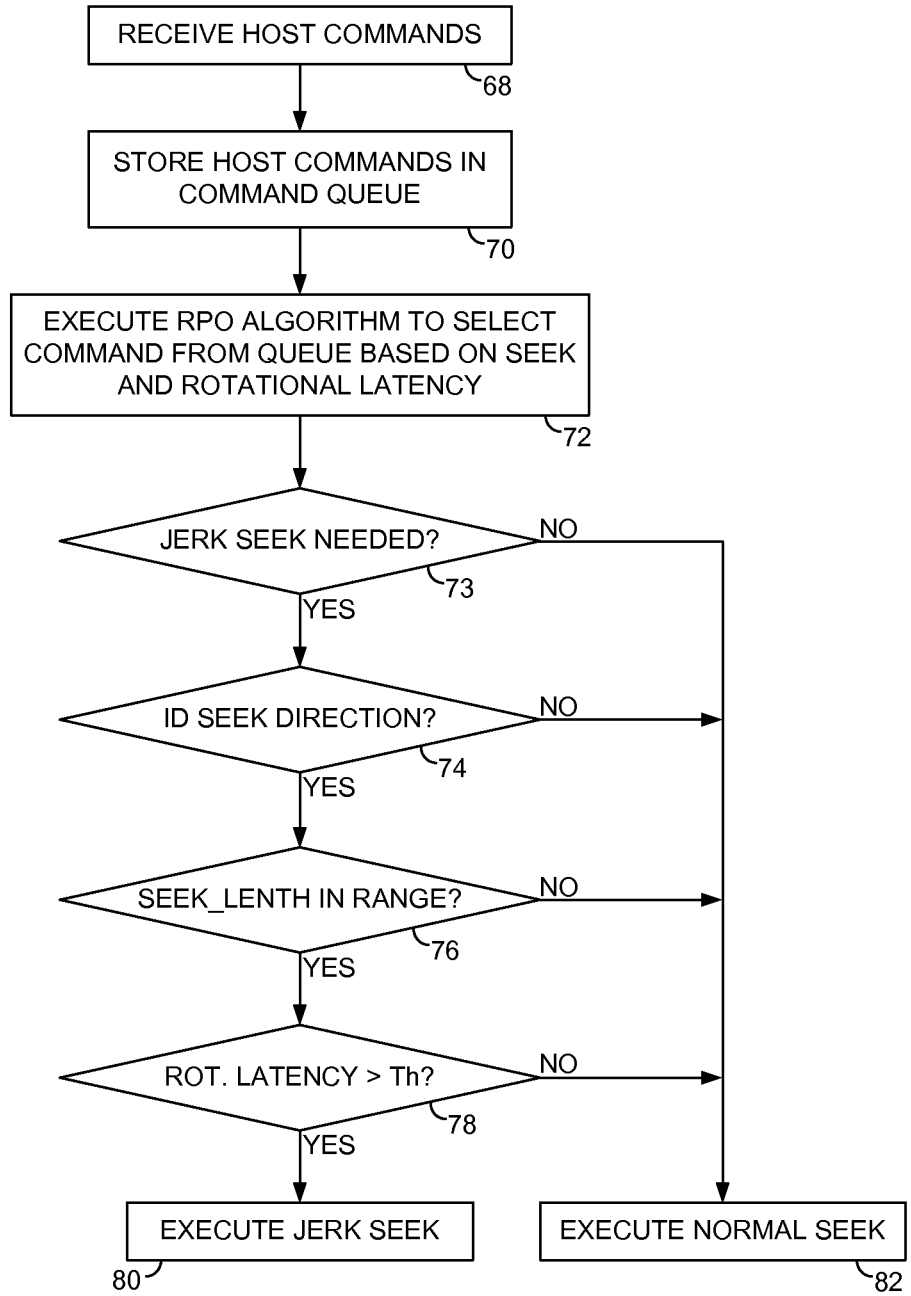
FIG. 7 is a flow diagram according to an embodiment wherein a jerk seek may be executed during normal operation when the rotational latency of a host command exceeds a threshold.

In one embodiment, the flow diagram of FIG. 7 may be modified to determine first whether a jerk seek is needed before the RPO algorithm selects the next host command to execute from the command queue. If a jerk seek is needed, the RPO algorithm may be modified to select a host command that satisfies the criteria for a jerk seek (e.g., toward ID, sufficient seek length, rotation latency greater than a threshold, etc.). If none of the host commands in the command queue satisfy the criteria for a jerk seek, in one embodiment the control circuitry may interrupt the host command processing in order to force a jerk seek.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
    a disk comprising a plurality of tracks;
    a head attached to a distal end of an actuator arm;
    a voice coil motor (VCM) operable to rotate the actuator arm about a pivot bearing including a race and a plurality of ball bearings; and
    control circuitry operable to:
        control the VCM to execute a first jerk seek in a first radial direction so that the ball bearings slip within the race by a first rotation angle; and
        control the VCM to execute a second jerk seek in the first radial direction so that the ball bearings slip within the race by a second rotation angle, wherein the second rotation angle adds to the first rotation angle in order to rotate the ball bearings relative to the race at a reference angle of the pivot bearing.

2. The disk drive as recited in claim 1, wherein the control circuitry is operable to control the VCM to execute a number of jerk seeks in the first direction to cause the ball bearings to rotate at least 180 degrees relative to the race at the reference angle of the pivot bearing.

3. The disk drive as recited in claim 1, wherein the control circuitry is operable to:
    control the VCM relative to a first state trajectory to execute the first and second jerk seeks in the first radial direction; and
    control the VCM relative to a second state trajectory to execute a normal seek in a second radial direction opposite the first radial direction.

4. The disk drive as recited in claim 1, wherein the control circuitry is operable to:
    control the VCM to execute the first jerk seek from a first track to a second track; and
    control the VCM to execute a non-jerk seek from the second track to the first track, wherein the normal seek reduces a jerk force so as to minimize the ball bearings slipping within the race.

5. The disk drive as recited in claim 4, wherein the non-jerk seek comprises a normal seek executed while accessing data from the disk during an access operation.

6. The disk drive as recited in claim 4, wherein the non-jerk seek is slower than a normal seek executed while accessing data from the disk during an access operation.

7. The disk drive as recited in claim 4, wherein the control circuitry is operable to execute the first jerk seek from the first track to the second track during an idle mode of the disk drive.

8. The disk drive as recited in claim 1, wherein the control circuitry is operable to control the VCM relative to a state trajectory to execute the first jerk seek, wherein the state trajectory causes a jerk force when transitioning from an acceleration trajectory to a deceleration trajectory.

9. The disk drive as recited in claim 1, wherein the control circuitry is operable to control the VCM relative to a state trajectory to execute the first jerk seek, wherein the state trajectory causes the head to overshoot a target track.

10. The disk drive as recited in claim 1, wherein the control circuitry is operable to control the VCM relative to a state trajectory to execute the first jerk seek, wherein the state trajectory causes the head to undershoot a target track.

11. The disk drive as recited in claim 1, wherein the control circuitry is operable to control the VCM to execute the first jerk seek by disabling a notch filter in a servo control system.

12. The disk drive as recited in claim 1, wherein the control circuitry is operable to control the VCM to execute the first jerk seek to access a track when servicing a host command.

13. The disk drive as recited in claim 12, wherein the control circuitry is operable to control the VCM to execute the first jerk seek when a seek length associated with servicing the host command falls within a target seek length range.

14. The disk drive as recited in claim 12, wherein the control circuitry is operable to:
    store a plurality of host commands in a command queue;
    execute a rotational position optimization (RPO) algorithm to select the host command from the command queue based on a seek latency of the head and a rotation latency of the disk; and control the VCM to execute the first jerk seek when the rotational latency of the host command exceeds a threshold.

15. A method of operating a disk drive comprising a disk comprising a plurality of tracks, a head attached to a distal end of an actuator arm, and a voice coil motor (VCM) operable to rotate the actuator arm about a pivot bearing including a race and a plurality of ball bearings, the method comprising:
controlling the VCM to execute a first jerk seek in a first radial direction so that the ball bearings slip within the race by a first rotation angle; and
controlling the VCM to execute a second jerk seek in the first radial direction so that the ball bearings slip within the race by a second rotation angle, wherein the second rotation angle adds to the first rotation angle in order to rotate the ball bearings relative to the race at a reference angle of the pivot bearing.

16. The method as recited in claim 15, further comprising controlling the VCM to execute a number of jerk seeks in the first direction to cause the ball bearings to rotate at least 180 degrees relative to the race at the reference angle of the pivot bearing.

17. The method as recited in claim 15, further comprising:
controlling the VCM relative to a first state trajectory to execute the first and second jerk seeks in the first radial direction; and
controlling the VCM relative to a second state trajectory to execute a normal seek in a second radial direction opposite the first radial direction.

18. The method as recited in claim 15, further comprising:
controlling the VCM to execute the first jerk seek from a first track to a second track; and
controlling the VCM to execute a non-jerk seek from the second track to the first track, wherein the normal seek reduces a jerk force so as to minimize the ball bearings slipping within the race.

19. The method as recited in claim 18, wherein the non-jerk seek comprises a normal seek executed while accessing data from the disk during an access operation.

20. The method as recited in claim 18, wherein the non-jerk seek is slower than a normal seek executed while accessing data from the disk during an access operation.

21. The method as recited in claim 18, further comprising executing the first jerk seek from the first track to the second track during an idle mode of the disk drive.

22. The method as recited in claim 15, further comprising controlling the VCM relative to a state trajectory to execute the first jerk seek, wherein the state trajectory causes a jerk force when transitioning from an acceleration trajectory to a deceleration trajectory.

23. The method as recited in claim 15, further comprising controlling the VCM relative to a state trajectory to execute the first jerk seek, wherein the state trajectory causes the head to overshoot a target track.

24. The method as recited in claim 15, further comprising controlling the VCM relative to a state trajectory to execute the first jerk seek, wherein the state trajectory causes the head to undershoot a target track.

25. The method as recited in claim 15, further comprising controlling the VCM to execute the first jerk seek by disabling a notch filter in a servo control system.

26. The method as recited in claim 15, further comprising controlling the VCM to execute the first jerk seek to access a track when servicing a host command.

27. The method as recited in claim 26, further comprising controlling the VCM to execute the first jerk seek when a seek length associated with servicing the host command falls within a target seek length range.

28. The method as recited in claim 26, further comprising:
storing a plurality of host commands in a command queue;
executing a rotational position optimization (RPO) algorithm to select the host command from the command queue based on a seek latency of the head and a rotation latency of the disk; and
controlling the VCM to execute the first jerk seek when the rotational latency of the host command exceeds a threshold.

* * * * *